(12) United States Patent
Rasmussen

(10) Patent No.: US 8,088,453 B1
(45) Date of Patent: Jan. 3, 2012

(54) ELECTROACTIVE MATERIALS AND ELECTROACTIVE ACTUATORS THAT ACT AS ARTIFICIAL MUSCLE, TENDON, AND SKIN

(76) Inventor: Lenore Rasmussen, Hillsborough, NJ (US)

( * ) Notice: Subject to any disclaimer, the term of this patent is extended or adjusted under 35 U.S.C. 154(b) by 558 days.

(21) Appl. No.: 12/319,804

(22) Filed: Jan. 13, 2009

(51) Int. Cl.
*C08F 2/46* (2006.01)
(52) U.S. Cl. .................... 427/487; 427/488; 427/58
(58) Field of Classification Search ............... 427/487, 427/488, 58
See application file for complete search history.

(56) References Cited

U.S. PATENT DOCUMENTS

| | | | |
|---|---|---|---|
| 5,736,590 A | 4/1998 | Rasmussen | |
| 6,109,852 A | 8/2000 | Shahinpoor | |
| 7,923,064 B2 * | 4/2011 | Pelrine et al. | 427/171 |

OTHER PUBLICATIONS

U.S. Appl. No. 11/478,431, filed Jul. 2005, Rasmussen, Lenore.

* cited by examiner

*Primary Examiner* — Eisa Elhilo
(74) *Attorney, Agent, or Firm* — Cozzarelli Law; Frank Cozzarelli, Jr.

(57) ABSTRACT

This invention describes a method for producing a novel, superior electroactive material and electroactive actuator, which act as artificial muscle, tendon, fascia, perimysium, epimysium, and skin that wrinkles and with the preferred movement of contraction, comprising ion-containing, cross-linked electroactive material(s); solvent(s); electrolyte(s); plasma treated electrode(s); attachments to levers or other objects; and coating(s). The composition and electrode configuration of the electroactive material of the electroactive actuator can be optimized so that contraction occurs when activated by electricity, when allowed to relax back to its original conformation, when the polarity of the electrodes is reversed, or a combination of these movements, such as antagonistic pairs. The electroactive material itself or the electroactive actuator may be used individually or grouped to produce movement when activated by electricity. This invention can provide for human-like motion, durability, toughness, and strength.

35 Claims, 3 Drawing Sheets

ELECTROACTIVE MATERIALS AND ELECTROACTIVE ACTUATORS THAT ACT AS ARTIFICIAL MUSCLE, TENDON, AND SKIN

TECHNICAL FIELD OF THE INVENTION

This invention relates to a composition and a method for producing materials and actuators that respond to electricity, converting electrical energy into mechanical energy in the form of movement, causing said electroactive materials and electroactive actuators to act as artificial muscle, tendon, human-like skin and for use with mechanical devices.

BACKGROUND OF THE INVENTION

Electroactive materials can be broadly separated into three types of materials: piezoelectric materials, elastomers between two electric plates, and ion-containing materials. Most piezoelectric materials undergo length changes of only a fraction of one percent. The movement from electroactive materials that use an elastomer between two electric plates is visible to the naked eye, however these materials use extremely high voltages, measured in the kilovolt range, and once that type of electroactive material is activated it remains static. With ion-containing electroactive materials, the material itself responds to electricity by movement that is visible to the naked eye, and as long as the electricity is on, these materials typically continue to move. The voltage requirements for ion-containing electroactive materials are much lower than elastomeric electroactive materials, typically less than 100 volts. Historically, ion-containing electroactive materials have had some drawbacks: many of the ion-containing electroactive polymers are inherently weak materials and, typically being hydrogels, if they dry out, then they become hard, brittle, inflexible, and thus electrically unresponsive.

Applicant has previously found that copolymers comprising cross-linked networks of methacrylic acid and 2-hydroxyethyl methacrylate, (PMA-co-PHEMA) cross-linked with cross-linking agents such as ethylene glycol dimethacrylate and 1,1,1-trimethylolpropane trimethacrylate, are superior ionic electroactive materials, with tensile strengths well above the tensile strengths of other ion-containing electroactive materials found in the prior art at that time (U.S. Pat. No. 5,736,590, [1998]). A relatively small amount of electricity caused movement.

TABLE 1

Strengths of some common ion-containing electroactive polymers compared to PMA-co-PHEMA cross-linked networks:

| Materials | Tensile Strength (MPa) |
| --- | --- |
| Poly(acrylamide) gels | 0.03 |
| Poly(vinyl alcohol)-poly(acrylic acid) gels | 0.23 |
| Poly(hydroxyethyl meth acrylic acid)-poly (methacrylic acid) cross-linked network gels† | 0.33 |

†0.28 to 0.76 MPa range for these types of materials

In 2004 and 2005, applicant developed strong electroactive materials that had pronounced responsive movement to electricity, which led to another drawback. If the electroactive material responded quickly with a lot of movement, then the electrodes often detached. If even one electrode detached, then the actuator failed. This challenge was addressed by plasma treating the electrodes to improve the polymer-metal interface, so that the electrodes and the electroactive material would work as a unit, similar to how nerves are integrated into muscle tissue. By plasma treating the electrodes, which are inserted or embedded into the electroactive material, a much better polymer-metal interface could be achieved between the embedded electrodes and the electroactive material as described in applicant's U.S. patent application Ser. No. 11/478,431. A good polymer-metal interface is crucial because the electroactive materials developed by applicant undergo pronounced movement. Applicant has found that by encapsulating or coating the electroactive materials, with embedded electrodes, the actuator can be free-standing, independent of submersion in an electrolytic solution as described by applicant's U.S. patent application Ser. No. 11/478,431.

The novel electroactive materials and electroactive actuators described in the instant patent application use ion-containing electroactive materials that are produced within a defined range of cross-linking, along with other considerations, such as dilution of the monomer mix, choice of electrolyte, and the configuration of the electrodes, which allow for the preferred movement of contraction. Electroactive polymers in the prior art undergo a variety of movement. The movement of contraction is considered to be an extremely useful movement because of the similarity to movement produced by muscle tissue. The instant patent application discloses compositions of electroactive materials that undergo contraction and electrode configurations that further increase contraction in these electroactive materials and electroactive actuators. The instant patent application also discloses a novel, superior method to significantly improve the polymer-metal interface, preferably by plasma treating the titanium metal electrodes of the actuators with nitrogen plasma, followed by oxygen plasma or treated individually with either nitrogen plasma or oxygen plasma. By encapsulating or coating the electroactive materials, with embedded electrodes, these actuators can be operational anywhere.

SUMMARY OF THE INVENTION

This invention discloses a method for producing said novel, superior electroactive material and electroactive actuator, which act as artificial muscle, tendons, nerves, and devices where movement is required with the preferred movement of contraction when electricity is applied to the electroactive material. This is accomplished by producing an electroactive material comprising at least one monomer, controlling the amount of cross-linking of the electroactive material, diluting the monomer mix prior to polymerization, swelling the electroactive material in appropriate electrolyte solution, plasma treating the electrodes with nitrogen plasma followed by oxygen plasma to improve the metal-polymer interface, optimizing the configuration of the electrodes, attaching fibers if needed to the electroactive material and to other objects such as levers, and coating the electroactive material to allow the electroactive material and the electroactive actuator to operate anywhere. To produce movement or work, the electroactive material of the electroactive actuator is activated by electricity. The instant invention may revolutionize robots and prostheses by providing electroactive materials and electroactive actuators that have smooth two and three dimensional range of motion, good durability, high strength, and that may operate over a wide variety of environmental conditions. The preferred movement of these novel electroactive materials and electroactive actuators is contraction, which may allow for human-like robots and prostheses with life-like motion. The electroactive actuator can be made in a variety of shapes, sizes, and tendon-like strands.

With the above limitation of the current approaches in mind, it is an object of the present invention to provide a method and system that produces an electroactive material and electroactive actuator where the movement is preferably contraction in addition to other movements such as bending, flexing, wrinkling, buckling, rippling, or the combination of these movements.

Another object of the present invention is to provide a method and system that produces an electroactive material and electroactive actuator that when activated by electricity produce movement or work.

Another object of the present invention is to provide a method and system that produces an electroactive material and electroactive actuator where robots and prostheses have human-like motion.

Another object of the present invention is to provide a method and system that produces an electroactive material and electroactive actuator that wrinkles or moves in a way to feel like human skin to the touch.

Another object of the present invention is to provide a method and system that produces an electroactive material and electroactive actuator that wrinkles or moves in a way to appear like human skin.

Another object of the present invention is to provide a method and system that produced an electroactive material and electroactive actuator that feels warm to the touch. When electricity is applied, heat is generated, and the electroactive material becomes warm.

The objects, advantages, and features of the present invention are readily apparent from the following description of the preferred embodiment for carrying out the invention when taken in connection with the accompanying drawings.

A more complete appreciation of the invention and many of the attendant advantages and features thereof may be readily understood by reference to the following more detailed description of the drawings in which the reference characters indicate corresponding parts in all views and the detailed description.

The instant invention discloses and claims an electroactive actuator comprising a superior electroactive material, and a method for producing a said, superior electroactive material comprising at least one ion-containing monomer, controlling the amount of cross-linking, diluting the monomer mix prior to polymerization, swelling the electroactive material in an appropriate electrolyte solution, plasma treating the electrodes preferably of titanium with nitrogen plasma followed by oxygen plasma to improve the metal-polymer interface, attaching fibers if needed to the electroactive material, and encapsulating the electroactive material, with its electrodes and possibly other fibers, so that it can operate anywhere. The electroactive materials and electroactive actuators respond by movement, particularly contraction, to electricity, and are also strong, tough, resilient materials well suited for use where motion is required, even repetitious use. The electroactive material, also called the smart material, intelligent material, electroactive polymer, or electroresponsive material, is comprised of a flexible ion-containing material, such as a polymer comprising ion-containing monomers such as methacrylic acid, which can also contain polymers comprising non-ionic monomers such as 2-hydroxyethyl methacrylate, cross-linked with poly(ethylene glycol) dimethacrylate or other suitable cross-linking agents, such as ethylene glycol dimethacrylate, 1,1,1-trimethylolpropane trimethacrylate, or a combination of cross-linking agents. Other electroactive polymers may also be used as the electroactive material or as a component of the electroactive material, such as poly(vinyl alcohol), ionized poly(acrylamide), poly(acrylic acid), poly (acrylic acid)-co-(poly(acrylamide), poly(2-acrylamide-2-methyl-1-propane sulfonic acid), poly(methacrylic acid), poly(styrene sulfonic acid), quarternized poly(4-vinyl pyridinium chloride), poly(vinylbenzyltrimethyl ammonium chloride), sulfonated poly(styrene-b-ethylene-co-butylene-b-styrene), sulfonated poly(styrene), or materials that respond to electricity by movement, expansion, contraction, curling, bending, buckling, or rippling. The preferred electroactive material comprises the monomer methacrylic acid, polymerized and cross-linked, preferably with the cross-linking agent poly(ethylene glycol) dimethacrylate with a number average molecular weight around 330 grams per mole, cross-linked at a low level, less than 0.78 mole percent poly (ethylene glycol) dimethacrylate with respect to methacrylic acid, preferably cross-linked within a range of 0.31 to 0.44 mole percent poly(ethylene glycol) dimethacrylate with respect to methacrylic acid. Prior to polymerization, the monomer and cross-linking agent is diluted with a solvent miscible or compatible with the ion-containing monomer(s). Once polymerized and cross-linked, the electroactive material is further swollen with an electrolyte solution or electrolyte gel formulation. The electrolyte may be a simple salt such as sodium chloride, potassium chloride, or any salt with a group 1 or group 2 ion(s) and associated with group 16 or group 17 ion(s), a more complex salt such as lithium perchlorate, or an organic salt such as sodium acetate, an organometallic salt such as lithium methide, or any combination of electrolytes. Plasma treating, such as nitrogen plasma treatment, oxygen plasma treatment, or preferably nitrogen plasma treatment followed by oxygen plasma treatment, or otherwise treating the preferably titanium based electrodes, produced an improved metal-polymer interface, which is crucial for the success of the electroactive actuator because of the pronounced movements of the electroactive material(s). Alternatively or additionally, carbon fibers or other conductive materials, which are plasma treated or otherwise treated, may serve as the electrodes in or near the electroactive material. The ends of the electrodes in or near the electroactive material may be splayed, untwisted, or arranged into one or more filaments, meshes, nets, wires, or fibers. Covering the outer surface of the electroactive material with one or more coating(s) of an elastomeric material allows for the electroactive material to be removed from immersion in an electrolyte solution and operational in a variety of environments. To further optimize contraction in the electroactive material(s) and electroactive actuator(s), the electrodes were configured with the positive electrode inserted or embedded in the electroactive material to a greater degree than the negative electrode. The negative electrode may even be positioned external to the electroactive material as shown in (FIG. 2 and FIG. 3). The described composition, method, and configuration of the electroactive material and electroactive actuator, with electrodes, and sealed with a protective, elastomeric coating(s), acts as an artificial muscle within a protective "skin," where the electrodes serve as "nerves" delivering the electric impulse to the electroactive material of the electroactive actuator, and the electrodes also serve as "tendons" independently or with other materials to connect the electroactive material(s) of the electroactive actuators(s) to levers, joints, valves, mechanical devices, toys or other objects. Carbon particles or fibers, metal ions, or any other electrically conductive material, may be included in the electroactive material to enhance its electroactivity. Fibers or other materials may by attached to the electroactive materials and to levers, hinges, joints, valves, or other objects to produce movement and work, in conjunction with or independent of the electrodes. The electroactive material itself or the electroactive actuator may be used individually or grouped together in fibers, bulk, slabs, bundles, or other configurations to hinge joints, rotator (ball-and-socket) type joints, other joints, other hinges, hole-filling applications, hole-plugging applications, valves, levers, other objects, or anywhere movement or work is required. To produce movement or work, the electroactive material of the electroactive actuator is activated by electricity, the electroactive material of the electroactive actuator relaxes or returns to its original conformation after the electricity is stopped, the polarity of the electrodes is reversed, or a combination of movements from activation and relaxation or from reversing the polarity of the electrodes. An example of using a combination of movements is to arrange, place, or configure the electroactive materials or electroactive actuators as antagonistic pairs, similar to how muscles are arranged around joints. Antagonistic pairs are utilized to grip and hold as thumb and fingers do. By optimizing the electroactive material(s) and electroactive actuator(s) in terms of electroactivity, electrode configuration, mode of movement, and physical properties, electroactive materials and electroactive actuators may be designed for various applications, such as prostheses, robots, automation, toys, devices that fly, swim, walk, run, climb, stretch, swing, grasp, or use a combination of motions, valves, medical applications, industrial applications, or anywhere movement, particularly contraction, is desired. A thin layer of the electroactive material may also function as human-like fascia, perimysium, epimysium, and skin that even wrinkles. When electricity is applied, heat is generated, and the electroactive material becomes warmer, which makes it feel warm to the touch.

Sources of Supply

Methacrylic acid can be purchased from Sigma-Aldrich, St. Louis, Mo., Monomer-Polymer Dajac Laboratories, Inc., Feasterville, Pa., and other suppliers. Poly(ethylene glycol) dimethacrylate and other cross-linking agents can be purchased from Sigma-Aldrich and other suppliers. The electroactive materials are produced using standard free radical polymerization or photo-polymerization methods. Light activated initiators, such as 1-hydroxycyclohexyl phenyl ketone, can be purchased from Ciba, Sigma-Aldrich, and other suppliers. Thermally activated initiators, such as 2,2'-azodiisobutyronitrile or benzoyl peroxide, can be purchased from Sigma-Aldrich, Ciba, and other suppliers. Titanium based materials may be purchased from ESPI Metals, Ashland, Oreg., Dynamet, a subsidiary of Carpenter Technology Corporation, Washington, Pa., and other suppliers. Corrosion resistant stainless steel may be purchased from McMaster-Carr, Atlanta, Ga., Carpenter Technology Corporation, Reading, Pa., and other suppliers. The coating(s) for the actuator may comprise natural rubber, poly(butadiene), poly(vinylidene chloride), selected polyurethanes, Pliobond®, VHB tape, shrink-wraps, or combination of materials.

DESCRIPTION OF THE DRAWINGS

A more complete appreciation of the invention and many of the attendant advantages and features thereof may be readily understood by reference to the following description of the drawings in which the reference characters indicate corresponding parts in all views and the detailed description.

The actuators comprising electroactive materials shown in FIG. 1, FIG. 2 and FIG. 3 may be used as electroactive actuators. The electroactive material(s) can be spherical, cylindrical, conical, pyramidal, prism-shaped, spheroid, ellipsoid, cubical, rectangular prism shaped, toroid, parallelepiped-shaped, rhombic prism shaped, or any combination thereof. In FIG. 2 and FIG. 3, the negative electrode may be part of the coating or incorporated into the coating. The electroactive material itself or electroactive actuator may be used individually or grouped together in fibers, bulk, slabs, or bundles, to hinge joints, rotator (ball-and-socket) type joints, other hinges, other joints, valves, levers, or other objects. Alternatively or in addition to electrolyte solution or electrolyte gel formulation, carbon particles or fibers, metal ions, or any other electrically conductive material, may be present in the electroactive material to enhance electroactivity. The electrodes comprising conductive materials may be plasma-treated, etched, or otherwise treated. Adhesive can be applied to the areas where the electrodes or fibers protrude from the coating to provide additional strength and to prevent leakage.

LIST OF REFERENCE NUMERALS

Figure 1:
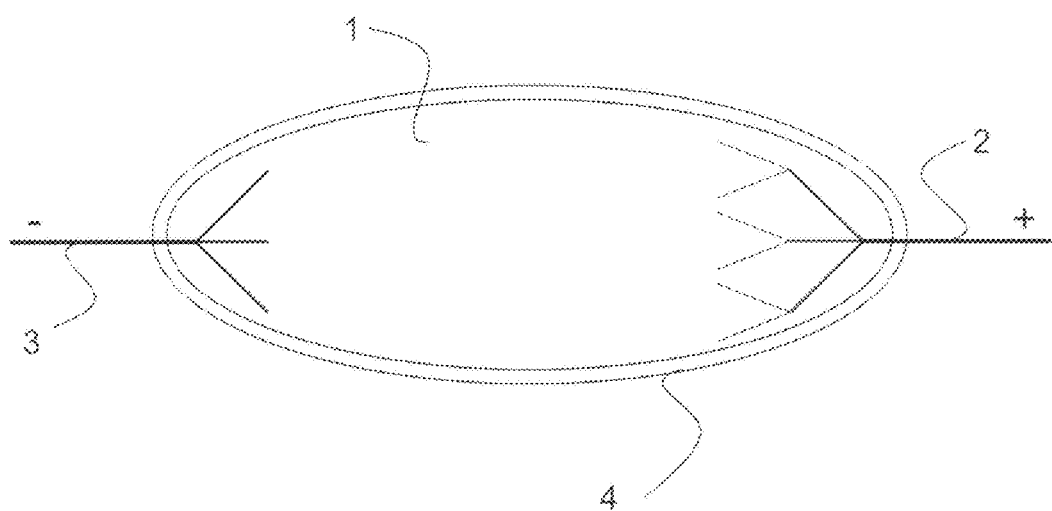
FIG. 1 shows an electroactive actuator, where 1 is the electroactive material, 2 is the positive electrode and 3 is the negative electrode. The ends of the electrodes can be splayed, untwisted, or arranged into filaments, meshes, nets, wires, or fibers, and inserted or embedded in the electroactive material 1. The electroactive material 1, with or without electrodes, can be encapsulated by a flexible coating 4. The electrodes in this depiction deliver the electric impulse and can also be attached to levers or other objects, independently or in conjunction with other fibers, to produce movement or work when the electroactive actuator is activated by electricity, when the electroactive actuator relaxes or returns to its original conformation after the electricity is stopped, when the polarity of the electrodes is reversed, or a combination of movements from activation and relaxation or from reversing the polarity of the electrodes.
Figure 2:
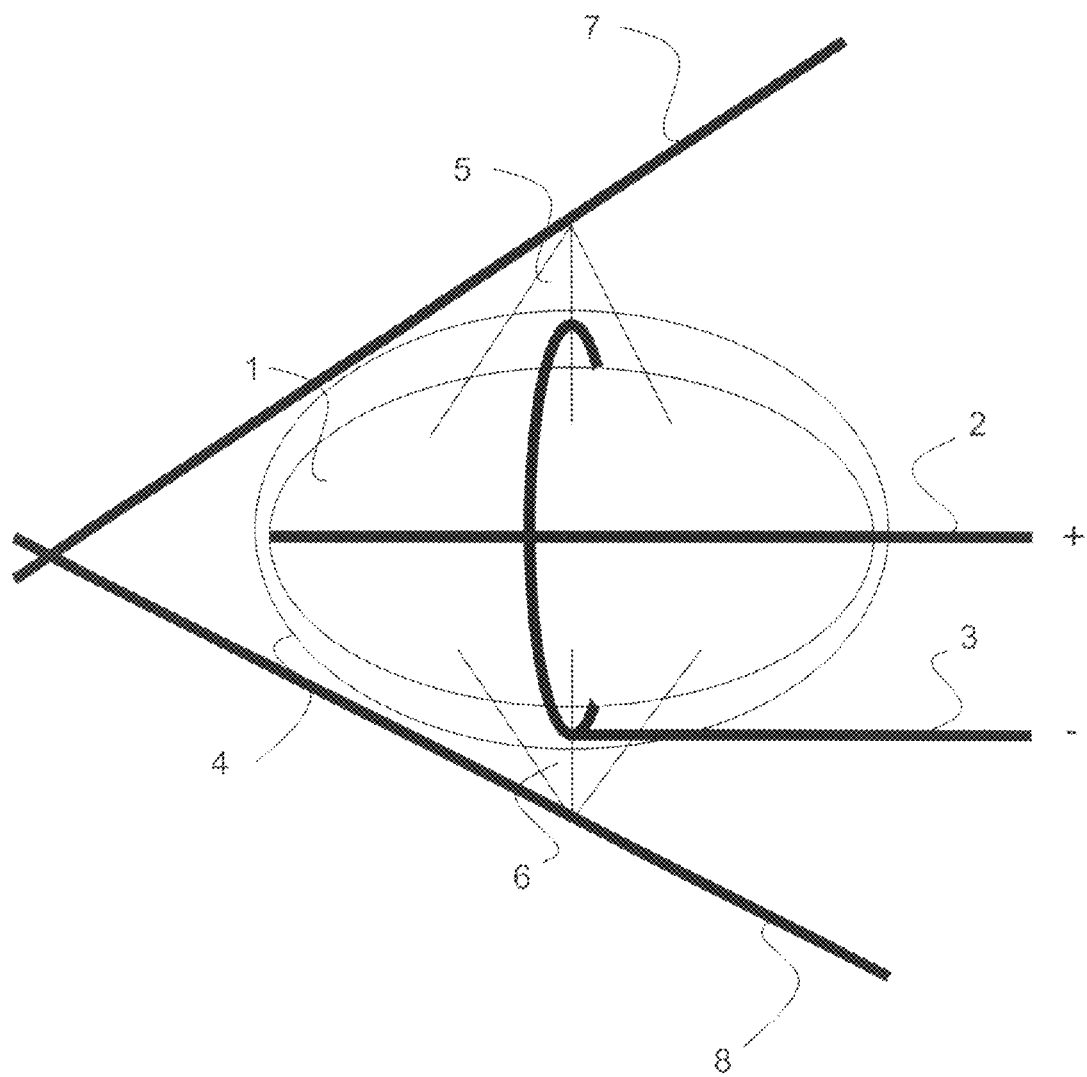
FIG. 2 shows an electroactive actuator, where the positive electrode 2 is inserted, embedded, or arranged in the electroactive material 1, with the negative electrode 3 placed near the electroactive material 1, however, the negative electrode 3 can also be inserted in the electroactive material 1. The electroactive material 1, with or without electrodes, is encapsulated by a flexible coating 4. Filaments, meshes, nets, wires, fibers, or web-like structures 5 and 6 connect the electroactive material 1 to levers 7 and 8 or other objects to produce movement or work when the electroactive actuator is activated by electricity, when the electroactive actuator relaxes after the electricity is stopped, when the polarity of the electrodes is reversed, or a combination of movements from activation and relaxation or from reversing the polarity of the electrodes.
Figure 3:
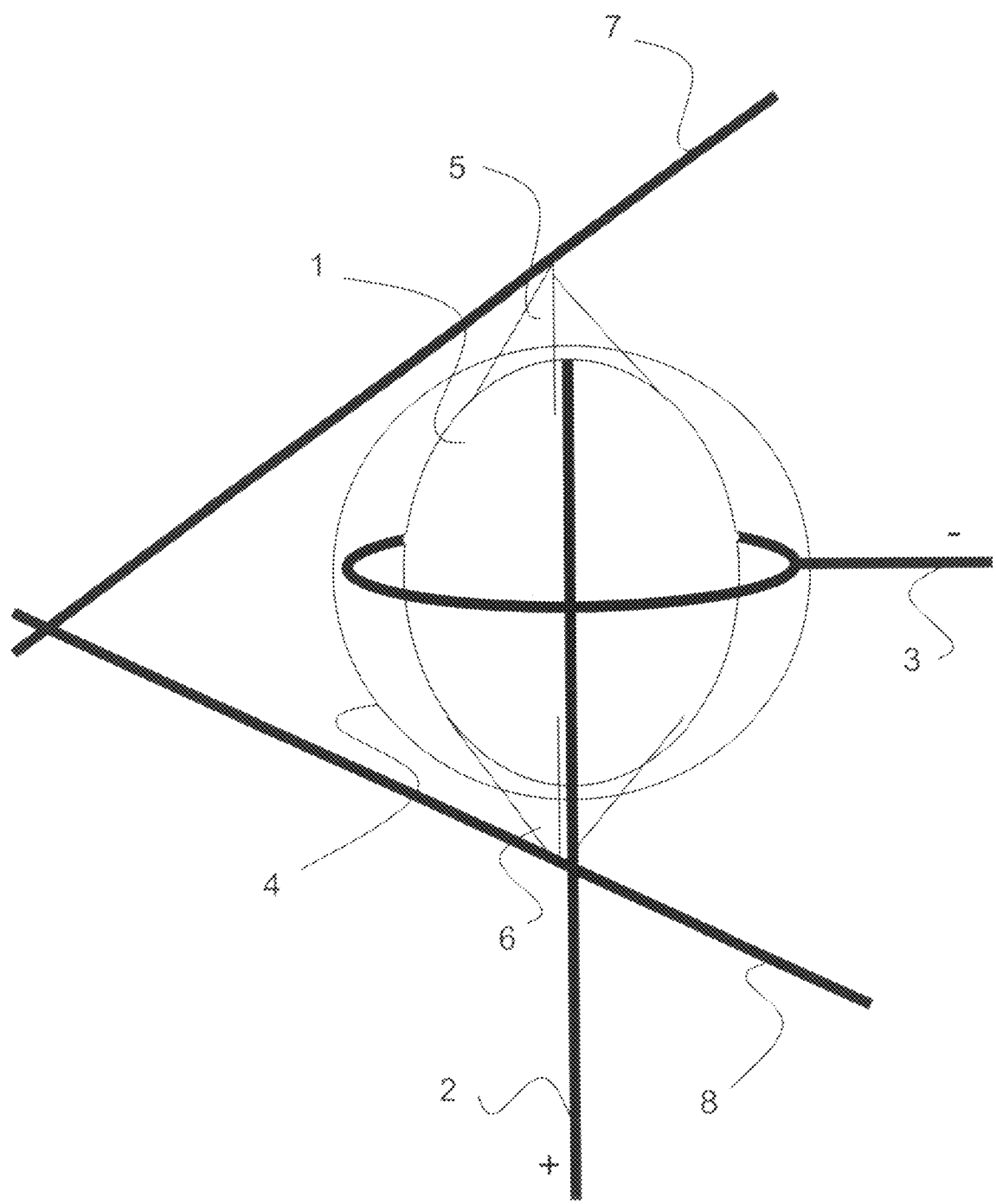
FIG. 3 shows an electroactive actuator, where the positive electrode 2 is inserted, embedded, or arranged in the electroactive material 1, with the negative electrode 3 placed near the electroactive material 1, however, the negative electrode 3 may also be inserted in the electroactive material 1. The electroactive material 1, with or without electrodes, is encapsulated by a flexible coating 4. Filaments, meshes, nets, wires, fibers, or web-like structures 5 and 6 connect the electroactive material 1 to levers 7 and 8 or other objects to produce movement or work when the electroactive actuator is activated by electricity, when the electroactive relaxes after the electricity is stopped, when the polarity of the electrodes is reversed, or a combination of movements from activation and relaxation or from reversing the polarity of the electrodes.

1=electroactive material
2=positive electrode
3=negative electrode
4=flexible encapsulating coating 5=filaments, meshes, nets, wires, fibers, or web-like structures
6=filaments, meshes, nets, wires, fibers, or web-like structures
7=lever
8=lever

DETAILED DESCRIPTION OF THE PREFERRED EMBODIMENT(S)

The present invention is based upon the discovery that a novel, superior electroactive material and electroactive actuator are produced by optimizing the composition of ion-containing electroactive materials, the degree of cross-linking of the electroactive material, the dilution of the monomer mix prior to polymerization, the choice of electrolyte(s), plasma treatment of the electrodes, the configuration of the electrodes, attachment of fibers if needed to the electroactive material and to other objects, and coating the electroactive material. The polymer-metal interface of the electrodes and the electroactive material is significantly improved by plasma treatment of the electrodes, preferably nitrogen plasma followed by oxygen plasma. The strength of the polymer-metal interface is crucial in any application where movement is encountered, particularly the preferred movement of the instant invention, contraction.

Example of the test procedure used follow.

Example 1

Tests are conducted by placing the preferred ingredients of the composition for the electroactive material into vials of sufficient volume to accommodate the size of the of the electroactive polymer desired, then the vial is shaken by hand, although stir bars or other mechanisms may be used. The vial sizes are from 10 mm to 15 mm in diameter. Tubing of 5 mm in diameter or less is also used when strands for tendon-like material is wanted. Polymerization is conducted using ultraviolet (UV) induced photo-initiation and can also use thermal free radical initiation.

Example 2

For example, in a vial, methacrylic acid (linear functionality equals 2), poly(ethylene glycol) dimethacrylate (cross-linking agent, functionality equals 3), UV initiator such as 1-hydroxycyclohexyl phenyl ketone or thermal free radical initiator such as 2,2-azobisisobutyronitrile or benzoyl peroxide, and water or glycerol as the solvent. The vial is purged with inert gas to remove oxygen. Then the vial is typically stirred by swirling by hand, and polymerizing to gelation using UV for photo-polymerizations or using heat for free radical polymerizations.

The preferred composition for the electroactive material, 1, is methacrylic acid, or other suitable ion-containing monomers, with or without 2-hydroxyethyl methacrylate or other non-ionic monomers, cross-linked with poly(ethylene glycol) dimethacrylate, or other suitable cross-linking agents, such as ethylene glycol dimethacrylate, 1,1,1-trimethylolpropane trimethacrylate, or a combination of cross-linking agents, preferably at a low level of cross-linking, preferably within a range of 0.31 to 0.44 mole percent poly(ethylene glycol) dimethacrylate ($<M_n>$~330 g/mole) with respect to methacrylic acid. These materials are produced using standard free radical polymerization or photo-polymerization methods, preferably in the presence of solvent(s), electrolyte solution, or an electrolyte gel miscible or compatible with the monomer(s). Prepolymers or oligomers may also be used. Cross-linking greatly improves the resilience, toughness, and in some cases, strength, of the electroactive materials, and within a defined range, may optimize the electroactive movement of contraction. A variety of materials may comprise the electroactive material, such as poly(vinyl alcohol), ionized poly(acrylamide), poly(acrylic acid), poly(acrylic acid)-co-(poly(acrylamide), poly(2-acrylamide-2-methyl-1-propane sulfonic acid), poly(methacrylic acid), poly(styrene sulfonic acid), quarternized poly(4-vinyl pyridinium chloride), and poly (vinylbenzyltrimethyl ammonium chloride), sulfonated poly(styrene-b-ethylene-co-butylene-b-styrene), sulfonated poly(styrene), or any material that responds to electricity by movement, expansion, contraction, curling, bending, buckling, or rippling.

The electrodes are preferably titanium based, but may be any suitably conductive material. The ends of the electrodes are preferably splayed, untwisted or arranged into one or more filaments, meshes, nets, wires, or fibers, and may be plasma treated, etched, or otherwise treated, preferably with nitrogen plasma, oxygen plasma, or a combination such as nitrogen plasma followed by oxygen plasma. Because the monomer mix is ionic, a hydrophilic metallic surface is desired for good metal-polymer adhesion. The water drop contact angle test is a good surface test. For both stainless steel and titanium, nitrogen plasma improves the metal surfaces. Oxygen plasma, following nitrogen plasma, significantly improves the metal surfaces in terms of producing a much more hydrophilic metallic surface (Table 2). Using the nitrogen, oxygen, and synthetic air plasma treatment improves the polymer-metal interface, particularly for titanium; however, using oxygen plasma has many safety considerations.

TABLE 2

| Water Drop Test: Average Water Drop Contact Angle on Metal Foils | | |
| --- | --- | --- |
| Treatment | Stainless Steel | Titanium |
| Control | 81° | 81° |
| Nitrogen Plasma | 26° | 47° |
| Oxygen Plasma | 4° | 5° |

The splayed, untwisted, or arranged ends of the electrodes, which are preferably plasma treated titanium, are then placed into position, preferably but not necessarily, in a mold prior to the polymerization and cross-linking of the electroactive material. The positive electrode is preferably in the electroactive material to a greater degree than the negative electrode, where the negative electrode may even be external to the electroactive material. After polymerization and cross-linking, the electroactive material is then allowed, if needed, to absorb electrolyte solution or electrolyte gel. The coating(s), covering(s), or encapsulation(s) comprise any suitable elastomer, such as natural rubber, poly(butadiene), poly(vinylidene chloride), selected polyurethanes, VHB tape, shrink-wraps, or combination of materials, which can be coated, sputter coated, or otherwise encapsulated around the electroactive material, parts of the electrodes, and possibly other connective fibers protruding from the electroactive material.

Mechanical stress tests were conducted on samples exposed to various plasma treatments, where the electrodes were inserted into the monomer mixture prior to polymerization, then polymerized with the electrodes in place at each end of the electroactive material. Stress to failure (pulling the actuator by the electrodes apart to break) was determined on the controls (no plasma treatment), nitrogen plasma treatment, and oxygen plasma treatment after nitrogen plasma treatment for titanium and stainless steel. The strongest metal-polymer interface was oxygen plasma treatment after nitrogen plasma treatment using titanium wires (Tables 3 and 4). All samples, including the controls, were degreased with acetone prior to any treatments.

TABLE 3

Stress Test to Break of Plasma Treated Titanium Electrodes in EAP Actuators

| Sample | Weight to Break (g) | Distance (cm) | Stress (N/m$^2$) | <Stress> (N/m$^2$) |
|---|---|---|---|---|
| Control 1† | 183 | 1 | 18.3 | — |
| Control 2 | 5,600 | 1.3 | 431 | 431 |
| N Plasma 1 | 6,800 | 1.5 | 453 | 476 |
| N Plasma 2 | 7,500 | 1.5 | 500 | |
| O Plasma 1 | 6,300 | 1 | 630 | 746 |
| O Plasma 2 | 6,900 | 0.8 | 862 | |

†Control 1 not used in average data set.

The electroactive material operates when electricity flows through the electrodes, which causes the material to move, expand, curl, bend, ripple, buckle, or preferably, contract. By optimizing the composition of the electroactive material and the configuration of the electrodes, an electroactive material was developed that contracts to less than twenty percent of its original weight within one minute at fifty volts. When the electricity is stopped, the electroactive material relaxes back to its original conformation. The polarity of the electrodes may be reversed to expedite the electroactive material back to its original conformation or to cause another mode of movement, or any combination of movements may be used. An example of combining movements is to arrange, place, or configure the electroactive materials or electroactive actuators as antagonistic pairs, similar to how muscles are arranged around joints.

The electroactive materials and electroactive actuators of this invention act as artificial muscle. These electroactive materials and actuators may move in two and three dimensions by arranging the electroactive material itself or the electroactive actuator, individually or grouped together, in fibers, bulk, slabs, bundles, or other configurations, to hinge joints, rotator (ball-and-socket) type joints, other joints, other hinges, hole-filling applications, hole-plugging applications, valves, levers, or other objects, to produce movement or work when the electroactive actuator is activated by electricity, when the electroactive actuator relaxes or returns to its original conformation after the electricity is stopped, when the polarity of the electrodes is reversed, or a combination of movements from activation and relaxation or from reversing the polarity of the electrodes. The novel, superior electroactive material and electroactive actuator of this invention may have an enormous impact on prostheses, valves, and automated systems, particularly robots, by providing for smooth two and three dimensional range of motion, good durability, high strength, and a mode of movement, namely contraction, that allows for human-like prosthetic and robotic designs with life-like motion and feel.

Alternative embodiments of practicing the invention, but within the sprit thereof, will in light of this disclosure, occur to persons skilled in the art. It is intended that this description be taken as illustrative only, and not be construed in any sense except by the following claims.

I claim:

1. A method for producing an electroactive material and an electroactive actuator having movement when activated by electrical stimulation from reactants comprising:
   (a) at least one ion-containing monomer;
   (b) at least one cross-linking agent, with a functionality of 3 or greater;
   (c) at least one electroactive material;
   (d) at least one diluent compatible or miscible with said ion-containing monomer;
   (e) at least one electrolyte solution;
   (f) placing at least one plasma treated conductive electrode in said electroactive material; and
   (g) polymerizing and cross-linking said reactants to produce said electroactive material of said electroactive actuator.

2. The method as defined in claim 1 wherein said ion-containing monomer of the electroactive material and the electroactive actuator is methacrylic acid.

3. The method as defined in claim 1 wherein said ion-containing monomer is a linear monomer or combination of monomers.

4. The method as defined in claim 1 wherein said cross-linking agent of the electroactive material and the electroactive actuator is poly(ethylene glycol) dimethacrylate.

5. The method as defined in claim 1 wherein said electrolyte solution is selected from the group comprising sodium chloride, potassium chloride, any salt with group 1 or group 2 ion(s) associated with group 16 or group 17 ion(s), complex salts of lithium perchlorate, sodium acetate, lithium methide, organo-metallic salts or any combination thereof; in addition, carbon particles or fibers, copper, iron ions, metal particles or filaments, or other electrically conductive material, or any combination of electrically conductive materials.

6. The method as defined in claim 1 wherein the electrolyte comprises ionic liquids and other electrolytes where neither water nor any other solvent is required.

7. The method as defined in claim 1 wherein said diluent is selected from the group comprising glycerol, water, organic alcohols, or other solvents or combination of solvents.

8. The method as defined in claim 1 wherein said plasma treated conductive electrodes placed in or near the electroactive material are selected from the group comprising metal electrodes, conductive carbon, or other conductive material.

9. The plasma treated conductive electrodes as defined in claim 8 wherein said plasma treated conductive electrodes ends are splayed, untwisted, or arranged into one or more filaments, meshes, nets, wires, or fibers.

10. The plasma treated conductive electrodes as defined in claim 8 wherein said plasma treated conductive electrodes ends are filaments, meshes, nets, wires, fibers, or web-like structures connected to said electroactive material, are connected to levers or other objects.

11. The method as defined in claim 1 wherein said electroactive material is coated with at least one thin elastomeric covering, wherein said elastomeric covering acts as human-like fascia, perimysium, epimysium, and skin.

12. The elastomeric covering of said elastroactive material as defined in claim 11 allows said elastoactive material to be operational, even when it is removed from immersion in said electrolytic solution.

13. The poly(ethylene glycol) dimethacrylate in claim 4 has a number average molecular weight is around 330 grams per mole.

14. The electroactive actuator of claim 1 is an artificial muscle and may be used anywhere movement is required.

15. The electroactive material of claim 1 is an artificial muscle and may be used anywhere movement is required.

16. The electroactive material of said electroactive actuator of claim 1 is a polymer, copolymer, or cross-linked network comprising polymerized methacrylic acid, other monomers, or a combination of monomers, cross-linked with poly(ethylene glycol) dimethacrylate, other cross-linking agents, or combination of cross-linking agents.

17. The ion-containing monomer as defined in claim 3 may be selected from the group comprising functionalized monomers in the methacrylate and acrylate family, of acrylic acid, or other monomers, such as vinyl alcohol, ionized 2-acrylamide, 2-methyl-1-propane sulfonic acid, styrene sulfonic acid, quarternized 4-vinyl pyridinium chloride, or vinylbenzyltrimethyl ammonium chloride, sulfonated styrene-β-ethylene, sulfonated styrene-β-butylene, sulfonated styrene, any combination of monomers, or any material that responds to electricity by movement, expansion, contraction, curling, bending, buckling, or rippling; and may be cross-linked from the group comprising poly(ethylene glycol) dimethacrylate, other cross-linking agents, of ethylene glycol dimethacrylate, 1,1,1-trimethylolpropane trimethacrylate, or any combination of cross-linking agents.

18. The electroactive material and said electroactive actuator of claim 1 comprises an ion-containing, flexible electroactive material, cross-linked at a low level of cross-linking agent with respect to linear monomer, less than 0.78 mole percent poly(ethylene glycol) dimethacrylate ($<M_n>$~330 g/mole) with respect to methacrylic acid, polymerized with or without solvent, and may be allowed to swell further in the presence of the electrolyte, electrolyte solution, or electrolyte gel formulation.

19. The electroactive material and electroactive actuator of claim 18 comprises an ion-containing, flexible electroactive material, cross-linked within a narrow range of said cross-linking agent with respect to linear monomer, within the range of 0.31 to 0.44 mole percent poly(ethylene glycol) dimethacrylate ($<M_n>$~330 g/mole) with respect to methacrylic acid, polymerized preferably with solvent, and may be allowed to swell further in the presence of electrolyte(s), electrolyte solution, or electrolyte gel formulation.

20. The plasma treated conductive electrodes of claim 1 are titanium based, treated with nitrogen plasma, oxygen plasma nitrogen plasma followed by oxygen plasma.

21. The method as defined in claim 1 wherein the positive electrode is inserted further into said electroactive material and electroactive actuator than the negative electrode to increase contraction of said electroactive material and electroactive actuator.

22. The method as defined in claim 1 of wherein the negative electrode may be placed in or near said electroactive material.

23. The method as defined in claim 1 of wherein movement of said electroactive material and said electroactive actuator is caused by applying electricity through the electrodes to cause bending, expansion, curling, buckling, rippling, or, contraction, or any combination of these movements, where typically, the more electricity that is applied the faster, more pronounced the movement, unless a threshold is met, or exceeded, at which point breakdown of the materials, actuator, system, or wiring may occur.

24. The method as defined in claim 1 wherein the more electricity applied produces more pronounced movement up to a threshold of too much movement.

25. The method as defined in claim 1 wherein said electrically activated electroactive material and said electroactive actuator are fibers, bulk, slabs, bundles, configured, to hinge joints, ball-and-socket rotor type joints, hinges, hole-filling applications, hole-plugging applications, valves, levers, or other objects, or anywhere movement is wanted and upon ending the application of electricity or reversing the polarity causes the electroactive actuator to relaxes and return to its original conformation in terms of size, weight and shape.

26. A method for producing an electroactive material and electroactive actuator that contracts and moves in response to applied electrical voltage comprising:
  a) mixing methacrylic acid monomer, poly(ethylene glycol) dimethacrylate with a number average molecular weight around 330 grams per mole, a sodium chloride solution, and diluting with glycerol, water, organic alcohols, or other solvents or combination of solvents;
  b) placing at least one nitrogen or oxygen plasma treated conductive electrodes in said electroactive material; and
  c) polymerizing said electroactive material with UV light producing said electroactive actuator.

27. The method as defined in claim 1 wherein when the positive electrode is embedded into said electroactive material and the negative electrode is placed near said electroactive material and wherein the applied electricity produces contraction of said electroactive material and when the polarity of applied electricity is reversed produces expansion of said electroactive material.

28. The method as defined in claim 27 wherein by alternately reversing the polarity of said electrodes continually produces alternating contraction and expansion cycles of said electroactive material repeatedly.

29. The method as defined in claim 1 wherein a fuel cell system is added close to the electroactive actuator so that when said electroactive actuator is operating above 1.23 V and thus producing gases, the gases are used by the fuel cell to produce electricity and water, which are provided back to said electroactive actuator.

30. The method as defined in claim 1 wherein the electroactive material could be made in complex shapes such as a toroid shape.

31. The method as defined in claim 30 wherein a series of toroid shaped electroactive materials could operate as peristaltic valves on the outside of a liner in order to operate as a peristaltic pump.

32. The method as defined in claim 31 wherein a fuel cell system is added to the peristaltic pump to provide for an energy efficient method to move liquid, sludge, and bilge.

33. The method as defined in claim 1 wherein said electroactive material comprises multi-phasic materials, with different zones having different physical properties.

34. The method as defined in claim 33 wherein higher levels of cross-linking are used in the zone where the connection to the embedded electrode enters said electroactive material, firmly tethering said embedded electrode into place.

35. The method as defined in claim 33 wherein higher levels of cross-linking are used in the zone where a connection to a lever enters said electroactive material, firmly tethering any levers in place.

* * * * *